(12) United States Patent
Lache et al.

(10) Patent No.: US 6,370,999 B1
(45) Date of Patent: Apr. 16, 2002

(54) STRAND-GUIDING ARM FOR BRAIDING MACHINE

(75) Inventors: Jürgen Lache; Dieter Prockat, both of Berlin (DE)

(73) Assignee: Schnellflechter Berlin GmbH, Berlin (DE)

( * ) Notice: Subject to any disclaimer, the term of this patent is extended or adjusted under 35 U.S.C. 154(b) by 0 days.

(21) Appl. No.: 09/540,332

(22) Filed: Mar. 31, 2000

(30) Foreign Application Priority Data

Apr. 1, 1999 (DE) .......................................... 199 16 416
Mar. 16, 2000 (DE) .......................................... 100 14 433

(51) Int. Cl.$^7$ .................................................. D04C 3/42
(52) U.S. Cl. ............................................................ 87/48
(58) Field of Search ............................................. 87/48

(56) References Cited

U.S. PATENT DOCUMENTS

| 1,689,389 A | * 10/1928 | Horn ............................. 87/48 |
| 4,034,642 A | 7/1977 | Iannucci |
| 4,034,643 A | 7/1977 | Iannucci |
| 4,729,278 A | 3/1988 | Graeff |
| 5,099,744 A | 3/1992 | Hurst |
| 5,613,643 A | * 3/1997 | Weiner ........................ 242/131 |
| 5,715,734 A | 2/1998 | Emmerich |

FOREIGN PATENT DOCUMENTS

EP   0 412 668   2/1991

OTHER PUBLICATIONS

"Drahtflechtanlage Unidra 24S, TYP 2410 S/4" Schnellflechter Berlin GmbH, 4 pages–No Date Supplied.

* cited by examiner

*Primary Examiner*—Andy Falik
(74) *Attorney, Agent, or Firm*—Herbert Dubno; Andrew Wilford

(57) ABSTRACT

A braiding-machine strand-guide arm has an outer end provided with a strand guide and an inner end formed as a pivot eye. The arm further has a body formed of spaced-apart outer layers of a hard material and a very low-density mass between the outer layers. The outer layers are formed of a plastic laminate reinforced with fibers of carbon, glass, boron, or metal. Whisker fibers can also be used as reinforcement. Preferably the laminate includes textile reinforcement. Alternately the hard material of the shell of the arm can be made of cast metal. The low-density mass is normally a solid material. It is a foamed plastic, typically a light polyurethane foam.

14 Claims, 6 Drawing Sheets

US 6,370,999 B1

STRAND-GUIDING ARM FOR BRAIDING MACHINE

FIELD OF THE INVENTION

The present invention relates to a braiding machine. More particularly this invention concerns a strand-guiding arm for a braiding machine.

BACKGROUND OF THE INVENTION

A braiding machine such as described in U.S. Pat. Nos. 4,034,642, 4,034,643, 5,099,744, and 5,715,734 or sold by Schnellflechter Berlin GmbH has inner and outer concentric wheel-like annular supports rotatable about a common normally vertical main axis and each carrying an array of strand supplies, typically spools of a filament. Each strand on the outer wheel passes through a guide eye or over a guide wheel on an outer end of a respective arm that is pivoted on the support about a respective arm axis. Means is provided to oscillate the arms about their axes. For instance, juxtaposed with each support is a stationary annular cam against which followers on the arms are urged by respective springs. The cams have guide edges on which the followers ride that are of sinusoidal shape, but normally 180° out of phase, so that, as the inner arms are cammed up, the outer arms are cammed down and vice versa, with the wheels being driven in opposite directions about the main axis. Alternately gear drives can be provided to oscillate the arms. The strands all pass to a common braid point where they are therefore formed into a tubular braid, for instance as a ground sheath around a coaxial cable.

The arms must move up and down rapidly, the faster the better so as to braid as quickly as possible. As they oscillate about their respective axes, the tension in the strand they are guiding changes radically.

As shown in FIG. 1, a typical prior-art arm 1 is made of cast aluminum and has an inner end 2 formed as an eye 3 centered on an arm axis C and formed with mounting holes 4, a body 5, and an outer end 6 having a pin 7 carrying a strand-guiding roller 8 rotatable about an axis B lying in a plane perpendicular to the axis C. Spaced along a longitudinal axis D closer to the inner arm end 2 than the outer arm end 6 is a mounting pin 10 carrying a cam-follower 10 riding on an unillustrated cam.

Although aluminum is a relatively light metal, the arm is still arm somewhat massive. As a result the braiding machine vibrates significantly when in use and is therefore subject to considerable wear.

European patent application 0,412,668 of Hurst and Harrington proposes making the braiding-machine swing arm of wire so as to reduce its mass and make it somewhat elastically deformable. While such a light arm has certain advantages, it is often insufficiently strong and is subject to elastic deformations of its own, in particular when the machine is running at a frequency producing a standing-wave oscillation in the arm.

OBJECTS OF THE INVENTION

It is therefore an object of the present invention to provide an improved braiding-machine guide arm.

Another object is the provision of such an improved braiding-machine guide arm which overcomes the above-given disadvantages, that is which is light but strong.

SUMMARY OF THE INVENTION

A braiding-machine strand-guide arm has an outer end provided with a strand guide and an inner end forming a pivot eye. The arm further has according to the invention a body formed of spaced-apart outer layers of a hard material and a very low-density mass between the outer layers. The outer layers are formed of a plastic laminate reinforced with fibers of carbon, glass, boron, or metal. Whisker fibers can also be used as reinforcement. Preferably according to the invention the laminate includes textile reinforcement. Alternately the hard material of the shell of the arm can be made of cast metal.

The low-density mass is normally a solid material. According to the invention it is a foamed plastic, typically a light polyurethane foam. Such a foam is extremely light but still structurally strong enough for the arm to maintain its shape.

The outer layers according to the invention can be formed as a continuous hollow outer shell completely surrounding the low-density mass. Alternately two generally flat and planar outer layers flank opposite sides of the low-density mass, each layer lying generally in a plane parallel to the pivot axis of the arm for maximum rigidity.

The body in accordance with the invention is asymmetrical to a longitudinal axis drawn between the ends. In addition the hard material includes a first textile reinforcement with carbon fibers extending substantially parallel and perpendicular to a longitudinal axis drawn between the ends and having a density of between 160 g/m$^2$ and 250 g/m$^2$, a second textile reinforcement with carbon fibers extending at about 45° to the longitudinal axis and having a density of between 160 g/m$^2$ and 250 g/m$^2$, a plurality of carbon-fiber reinforcement rovings with a weight of tex 1600 to 1700, a unidirectional carbon-fiber strip with a density of about 300 g/m$^2$, a third textile reinforcement with carbon fibers extending substantially parallel and perpendicular to the longitudinal axis and having a density of between 160 g/m$^2$ and 250 g/m$^2$, and a mass of resin having a density between 282 g/m$^2$ and 437 g/m$^2$ in which the textile reinforcements, rovings, and strip are imbedded.

The resin is an epoxy, a polyamide, a phenol, or a polyester. The body can be provided with mounting inserts for the eye. The inserts are metallic. The outer layers have a thickness between 0.6 mm and 1.3 mm.

With the light and rigid arm according to the invention it is possible to considerably increase the rotation speed of the braiding machine and, therefore, its output. The light arm subjects the operating transmissions and/or cams to substantially less wear also, so that the machine's service life between failure or servicings is greatly increased.

SPECIFIC DESCRIPTION

Figure 1:
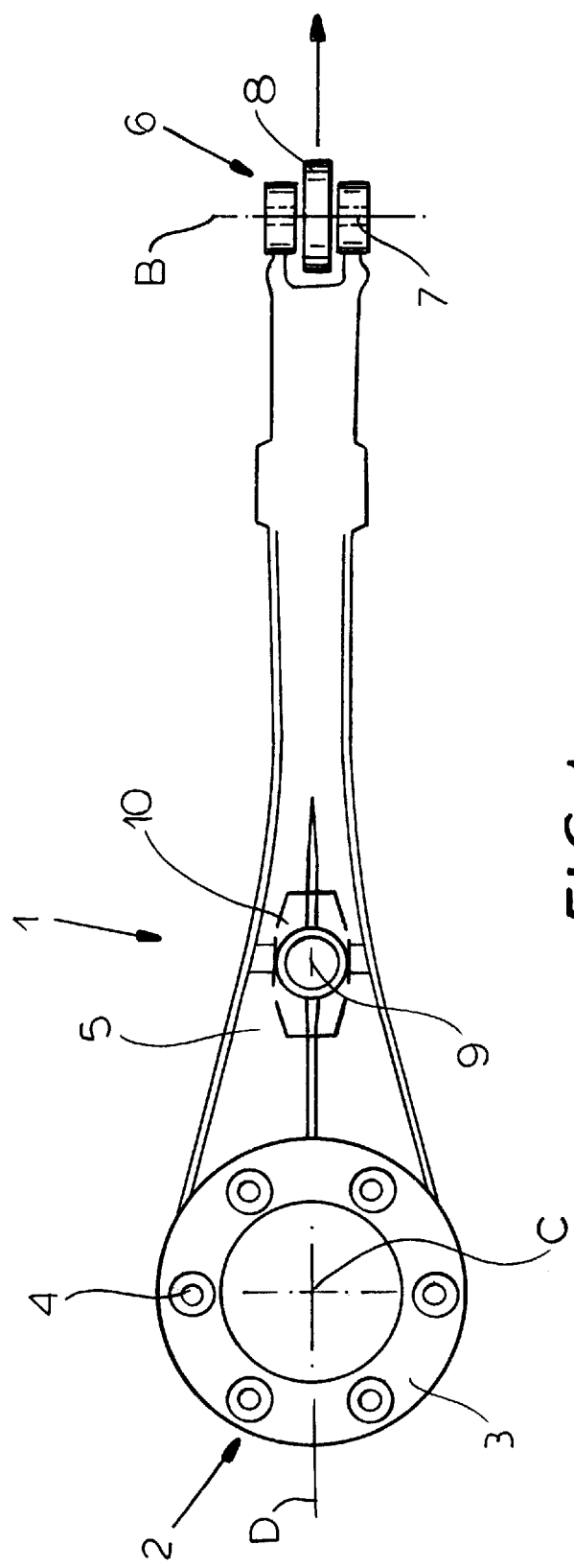
FIG. 1 is a side view of a prior-art braiding-machine guide arm.
Figure 2:
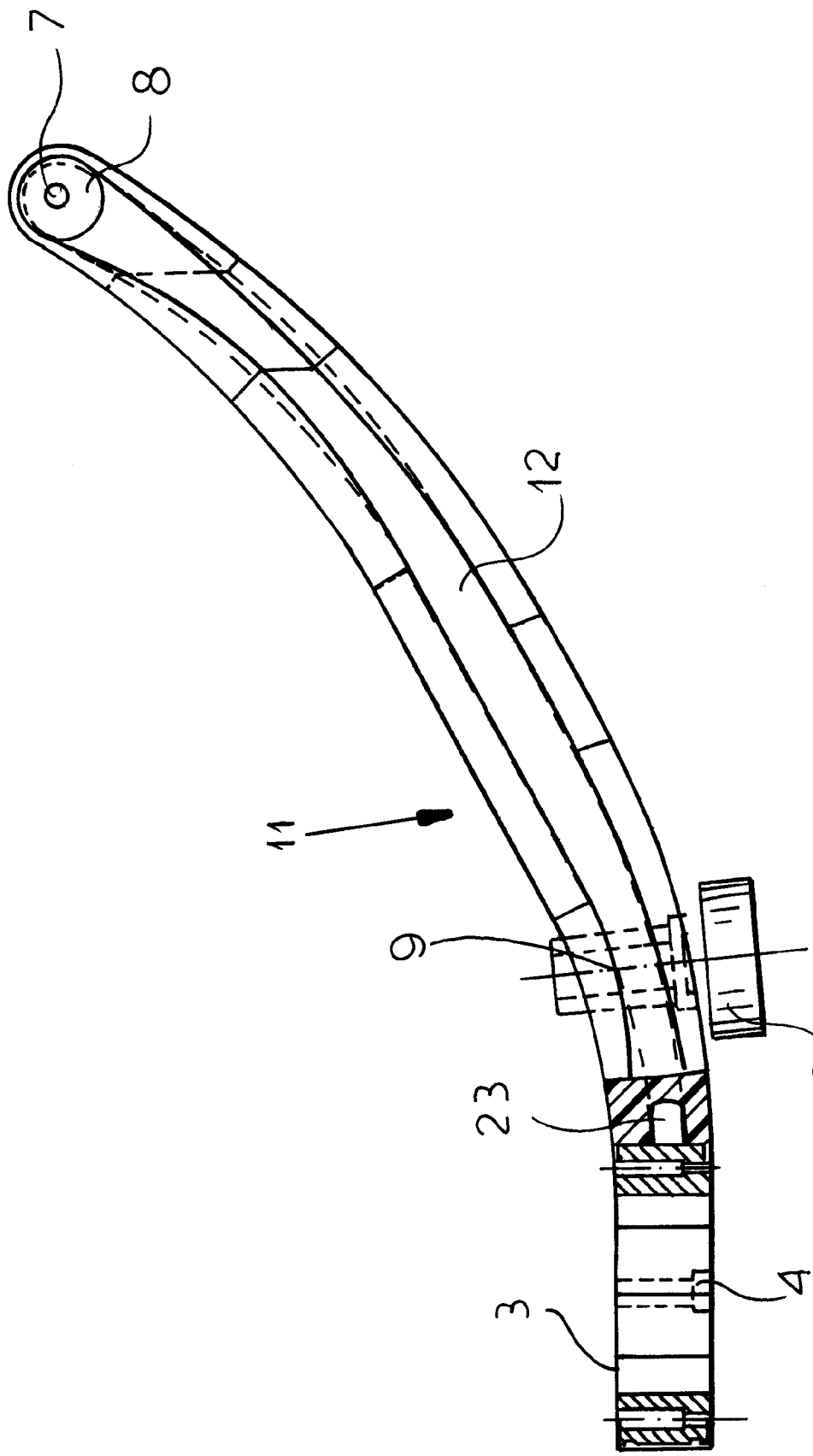
FIGS. 2 and 3 are partly sectional top and side views of a guide arm according to the invention.
Figure 3:
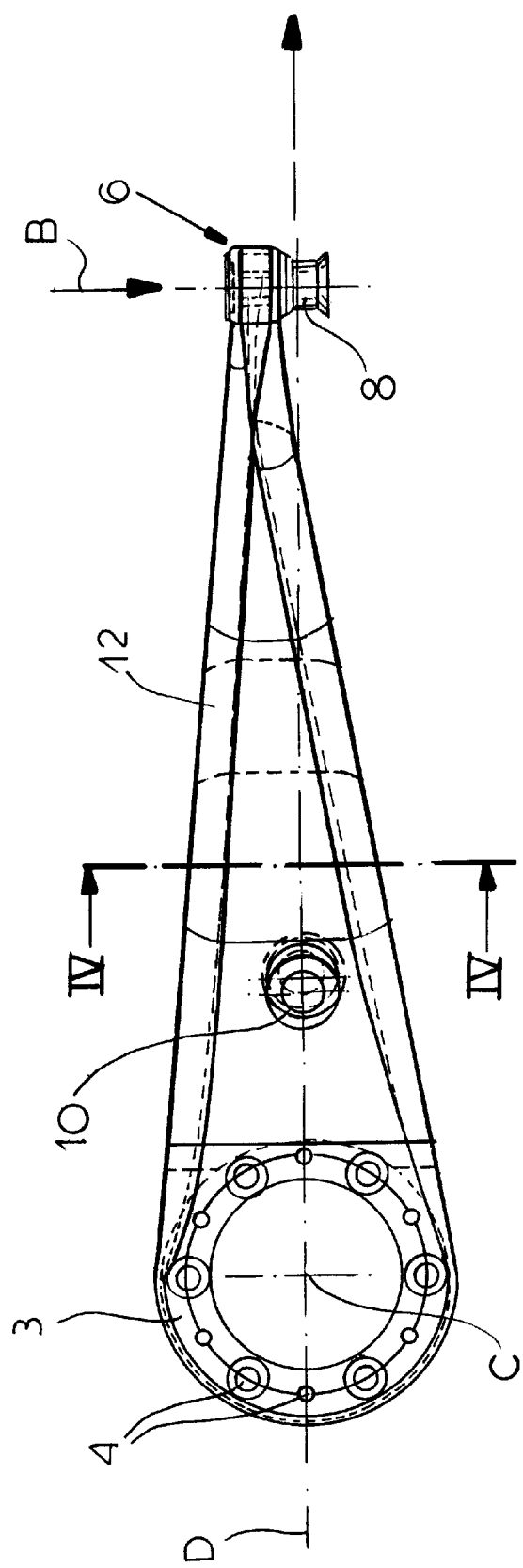
Figure 4:
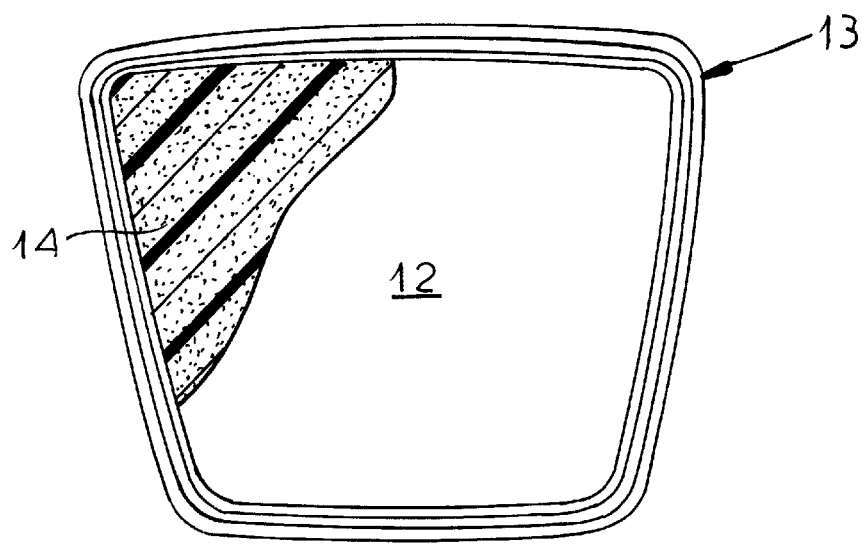
FIG. 4 is a section taken along line IV—IV of FIG. 3.

As seen in FIGS. 2 and 3, where reference numerals from FIG. 1 are used for functionally identical structure, a guide arm 11 is somewhat arcuate and is comprised of a body 12 having an outer fiber-reinforced laminated hollow plastic shell 13. The body 12 extends from the inner end 2 to the outer end carrying the roller 8 and at the outer end 6 lies somewhat offset from the axis D which is actually defined by the roller 8 and axis C so as to maximize stiffness. The shell 13 is filled as shown in FIG. 4 with a body 14 of polyurethane foam of a light density of 0.05 g/cm$^2$ which improves the stability of the arm 11.

Figure 6:
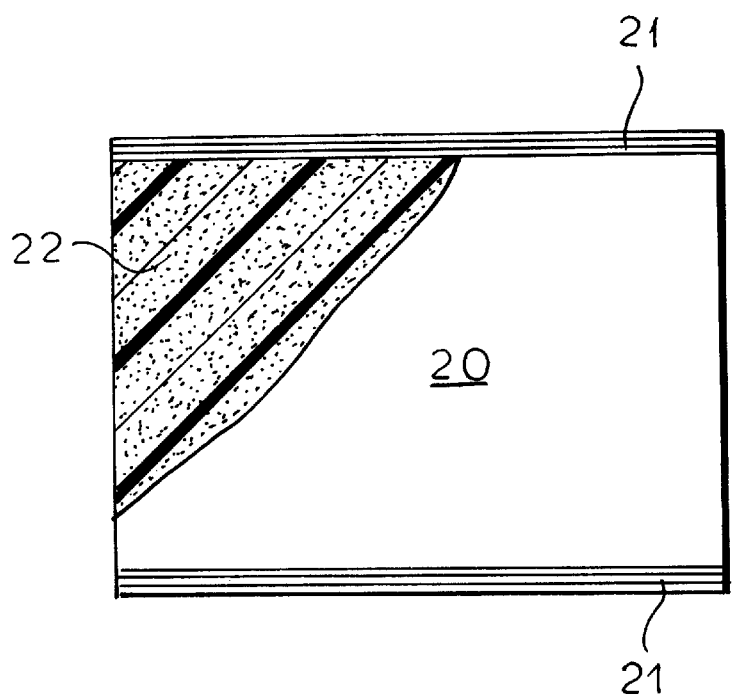
FIG. 6 is a section taken along line VI—VI of FIG. 5.
Figure 5:
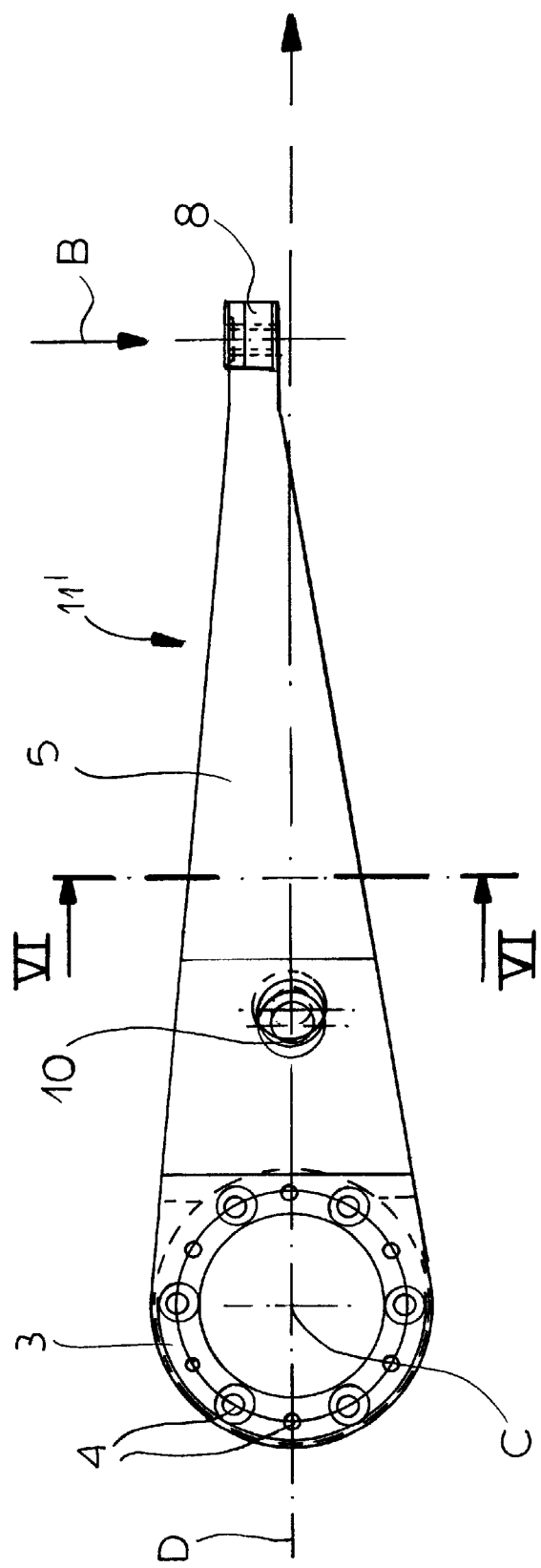
FIG. 5 is a side view of another guide arm in accordance with the invention.

FIGS. 5 and 6 show an arm 11' according to the invention which is formed as a sandwich 20 with a core 22 of light polyurethane and a pair of parallel skins 21 of fiber-reinforced plastic.

Figure 7:
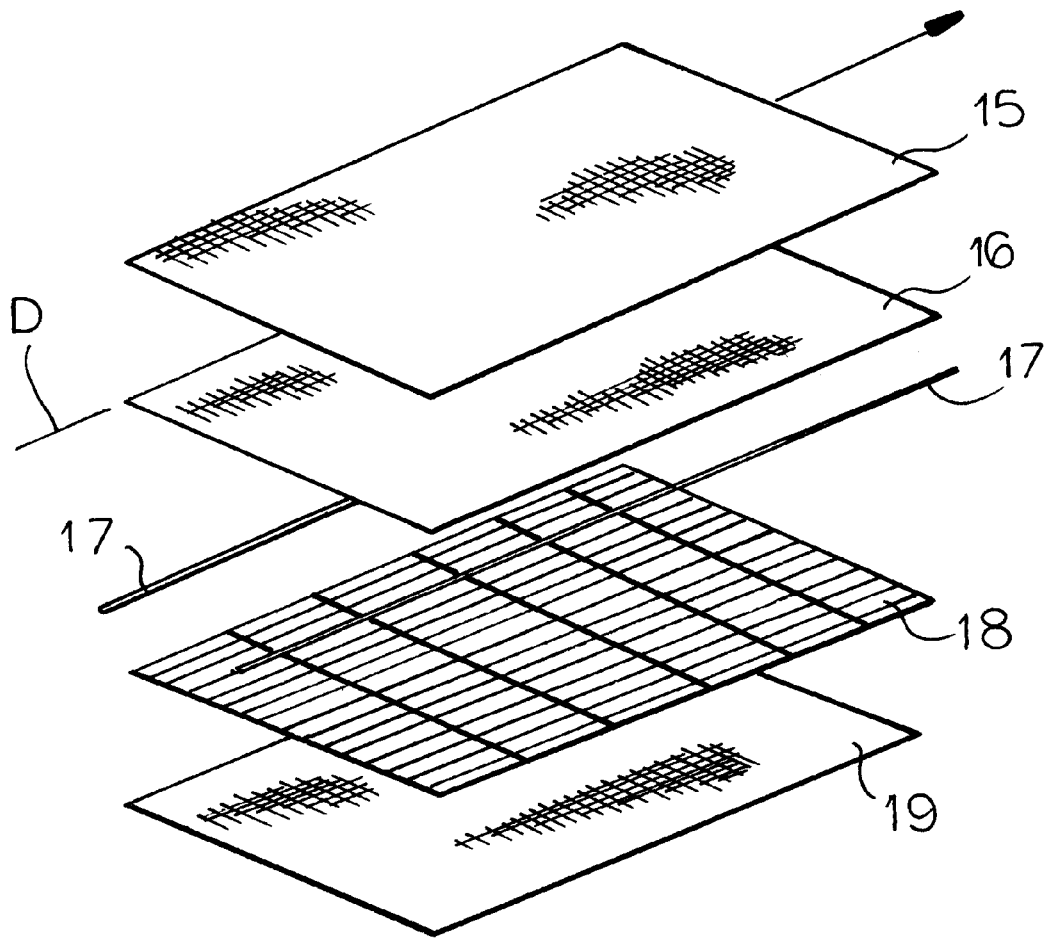
FIG. 7 is an illustration of the layers making up the guide arm according to the invention.

As shown in FIG. 7 the shell 13 which surrounds the core 14 or the skins 21 are comprised of a carbon-fiber textile reinforcement 15 with a density of 200 g/m$^2$ whose filaments extend perpendicular and parallel to the direction D and another such textile reinforcement 16 whose filaments extend at 45° to this direction D. In additional several carbon-fiber rovings or yarns 17 with a density of 1600 tex are used to retain the eye 3 in the lever. A unidirectional carbon-fiber strip 18 with a density of 300 g/m$^2$ and a width of 25 mm extends parallel to the direction and is overlain by another carbon-fiber textile 19 with a density of 200 g/m$^2$ with its filaments parallel and perpendicular to the direction D like the textile 15. All the layers 15, 10 16, 17, 18, and 19 are imbedded in an epoxy-resin mass, for instance Araldit (Ciba Geigy AG). Metallic inserts 23 (FIG. 2), e.g. of aluminum, can be imbedded in the shell 13 to hold the metallic eye 3 and follower pin 9 in place.

The arm according to the invention is very light and still quite stiff. It takes 70% less energy to move it than a standard metallic arm due to the reduced inertia.

We claim:

1. A strand-guide arm for a braiding machine, the arm having an outer end provided with a strand guide and an inner end forming a pivot eye, the arm comprising:
    a body formed of
        spaced-apart outer layers of a hard material and of
        a very low-density mass between the outer layers.

2. The braiding-machine guide arm defined in claim 1 wherein the outer layers are formed of a fiber-reinforced plastic laminate.

3. The braiding-machine guide arm defined in claim 1 wherein the laminate includes textile reinforcement.

4. The braiding-machine guide arm defined in claim 1 wherein the hard material includes metal.

5. The braiding-machine guide arm defined in claim 1 wherein the low-density mass is a solid material.

6. The braiding-machine guide arm defined in claim 1 wherein the low-density mass is a foamed plastic.

7. The braiding-machine guide arm defined in claim 1 wherein the outer layers are formed by a continuous hollow outer shell completely surrounding the low-density mass.

8. The braiding-machine guide arm defined in claim 1 wherein the outer layers are generally flat and planar and flank opposite sides of the low-density mass.

9. The braiding-machine guide arm defined in claim 1 wherein the body is asymmetrical to a longitudinal axis drawn between the ends.

10. The braiding-machine guide arm defined in claim 1 wherein the hard material includes
    a first textile reinforcement with carbon fibers extending substantially parallel and perpendicular to a longitudinal axis drawn between the ends and having a density of between 160 g/m$^2$ and 250 g/m$^2$,
    a second textile reinforcement with carbon fibers extending at about 45° to the longitudinal axis and having a density of between 160 g/m$^2$ and 250 g/m$^2$,
    a plurality of carbon-fiber reinforcement rovings with a weight of tex 1600 to 1700,
    a unidirectional carbon-fiber strip with a density of 300 g/m$^2$,
    a third textile reinforcement with carbon fibers extending substantially parallel and perpendicular to the longitudinal axis and having a density of between 160 g/m$^2$ and 250 g/m$^2$, and
    a mass of resin having a density between 282 g/m$^2$ and 437 g/m$^2$ in which the textile reinforcements, rovings, and strip are imbedded.

11. The braiding-machine guide arm defined in claim 10 wherein the resin is an epoxy, a polyamide, a phenol, or a polyester.

12. The braiding-machine guide arm defined in claim 10 wherein the body is further provided with mounting inserts for the eye.

13. The braiding-machine guide arm defined in claim 12 wherein the inserts are metallic.

14. The braiding-machine guide arm defined in claim 1 wherein the outer layers have a thickness between 0.6 mm and 1.3 mm.

* * * * *